US008443553B1

(12) United States Patent
Polewarczyk et al.

(10) Patent No.: US 8,443,553 B1
(45) Date of Patent: May 21, 2013

(54) CLOSURE ASSEMBLY WITH MOVEABLE COVER AND CLOSEOUT FOR A RETRACTABLE HANDLE

(75) Inventors: Joseph M. Polewarczyk, Rochester Hills, MI (US); Hesham A. Ezzat, Troy, MI (US); Steven C. Lang, Columbus, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/303,693

(22) Filed: Nov. 23, 2011

(51) Int. Cl.
*B60J 5/04* (2006.01)

(52) U.S. Cl.
USPC ........... 49/503; 16/412; 296/1.02; 292/336.3; 292/DIG. 31; 292/DIG. 63

(58) Field of Classification Search
USPC .............. 49/503; 296/181.7, 1.02, 1.05, 1.07, 296/1.08; 16/110.1, 412; 292/336.3, 347, 292/1, DIG. 31, DIG. 53, DIG. 63, DIG. 64
See application file for complete search history.

(56) References Cited

U.S. PATENT DOCUMENTS 5,560,659 A * 10/1996 Dault ......................... 292/336.3
5,904,385 A * 5/1999 Linder ....................... 292/336.3
6,062,614 A * 5/2000 Petzold ...................... 292/336.3
6,416,092 B1 * 7/2002 Rathmann .................. 292/336.3
7,108,301 B2 * 9/2006 Louvel ....................... 292/336.3
7,900,986 B2 * 3/2011 Browne et al. ............... 296/1.02
2004/0031301 A1 * 2/2004 Dominique ..................... 70/237
2009/0058132 A1 * 3/2009 Browne et al. ............. 296/181.7
2011/0121607 A1 * 5/2011 Browne et al. ............. 296/181.7

FOREIGN PATENT DOCUMENTS

EP 289715 A1 * 11/1988

* cited by examiner

*Primary Examiner* — Jerry Redman
(74) *Attorney, Agent, or Firm* — Quinn Law Group, PLLC

(57) ABSTRACT

A closure assembly includes a panel that defines an opening. A handle includes a grab bar that is moveable from a retracted position through the opening into an extended position. A cover is coupled to and moveable with the handle. The cover is disposed within the opening and flush with the exterior surface of the panel when in a closed position. When the handle moves from the retracted position into the extended position, the cover moves out of the closed position to allow the handle to pass through the opening. When the handle moves from the extended position into the retracted position, the cover moves into the closed position to close the opening. A closeout is coupled to and moveable with the handle. The closeout moves into an exposed position as the handle moves into the extended position to conceal the remainder of the opening not occupied by the handle.

20 Claims, 3 Drawing Sheets

CLOSURE ASSEMBLY WITH MOVEABLE COVER AND CLOSEOUT FOR A RETRACTABLE HANDLE

TECHNICAL FIELD

The invention generally relates to a closure assembly having a handle and a closeout system, such as for a door assembly of a vehicle.

BACKGROUND

Vehicle doors include an exterior handle that is mechanically or electrically coupled to a latch mechanism. Actuation of the handle moves the latch mechanism from a latched position to an un-latched position to allow the door to open. Vehicle styling may require that a grab bar of the handle be extendable outward through an opening beyond an exterior surface of the door assembly into an extended position for use. When not in use, the grab bar may be moved into a retracted position in an interior space of the door assembly, behind the exterior surface, thereby leaving the opening vacant and uncovered.

SUMMARY

A closure assembly is provided. The closure assembly includes a structure, and a side panel attached to the structure. The side panel includes an exterior surface and an interior surface disposed opposite the exterior surface. The side panel cooperates with the structure to define an interior space adjacent the interior surface of the side panel. The side panel defines an opening extending between the exterior surface and the interior surface of the side panel. A handle is coupled to the structure and includes a grab bar. The handle is rotatably moveable about a rotation axis between a retracted position and an extended position. The handle is completely disposed within the interior space when in the refracted position, and extends through the opening of the side panel, with the grab bar spaced from the exterior surface of the side panel when in the extended position. A cover is coupled to the structure. The cover is simultaneously moveable with the handle between an open position and a closed position. When the handle is in the retracted position, the cover is positioned in the closed position within the opening to cover the opening. The cover is disposed within the interior space and spaced from the opening when the handle is in the extended position to allow the handle to extend through the opening.

A door assembly for a vehicle is also provided. The door assembly includes a structure, and a side panel attached to the structure. The side panel includes an exterior surface and an interior surface disposed opposite the exterior surface. The side panel cooperates with the structure to define an interior space adjacent the interior surface of the side panel. The side panel defines an opening extending between the exterior surface and the interior surface of the side panel. A handle is coupled to the structure, and includes a grab bar. The handle is rotatably moveable about a rotation axis between a refracted position and an extended position. The handle is completely disposed within the interior space when in the refracted position. The handle extends through the opening with the grab bar spaced from the exterior surface of the side panel when in the extended position. A cover is coupled to the structure. The cover is simultaneously moveable with the handle between an open position and a closed position. The cover is positioned within the opening when in the closed position to cover the opening when the handle is in the refracted position. The cover is disposed within the interior space and spaced from the opening when the handle is in the extended position to allow the handle to extend through the opening. The door assembly includes a cam mechanism that is configured for guiding the cover between the closed position and the open position as the handle moves between the extended position and the refracted position. A closeout is coupled to the handle. The closeout is moveable between an exposed position and a hidden position. The closeout is disposed within the opening to conceal the opening when in the exposed position, and is disposed within the interior space and spaced from the opening when in the hidden position. The closeout is simultaneously moveable with the cover and the handle between the exposed position and the hidden position. The closeout moves into the exposed position as the handle moves into the extended position and the cover moves into the open position, and the closeout moves into the hidden position as the handle moves into the retracted position and the cover moves into the closed position.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, a closure assembly is generally shown at 20. The closure assembly 20 may include, but is not limited to a passenger side door assembly for a vehicle, a cargo door assembly, or some other similar door assembly. However, it should be appreciated that the closure assembly 20 may be configured for use at some other location of the vehicle, such as but not limited to a rear cargo door. Furthermore, it should be appreciated that the closure assembly 20 may include some other configuration not associated with a vehicle, such as but not limited to a file cabinet door or some other similar assembly.

Figure 4:
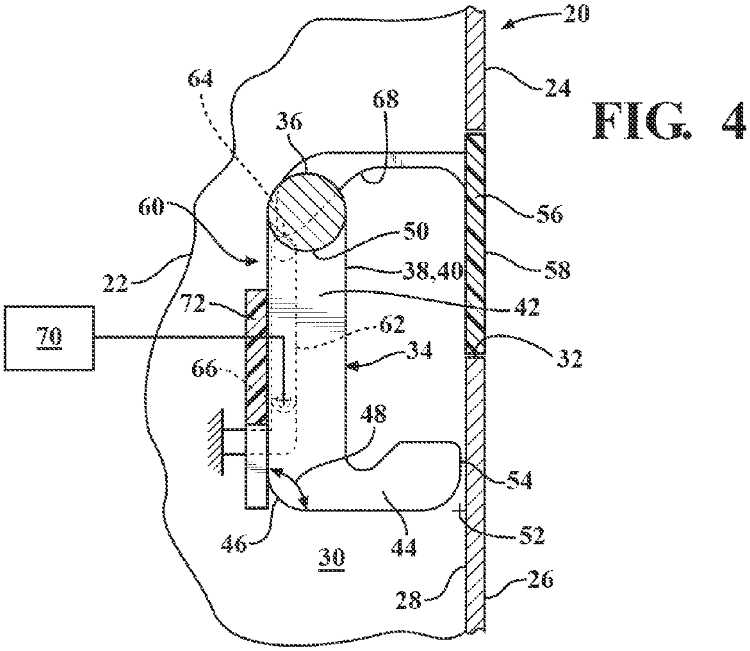
FIG. 4 is a schematic cross sectional view of the door assembly shown in FIG. 1 with the cover shown in the closed position, the handle shown in a retracted position, and the closeout shown in a hidden position.
Figure 5:
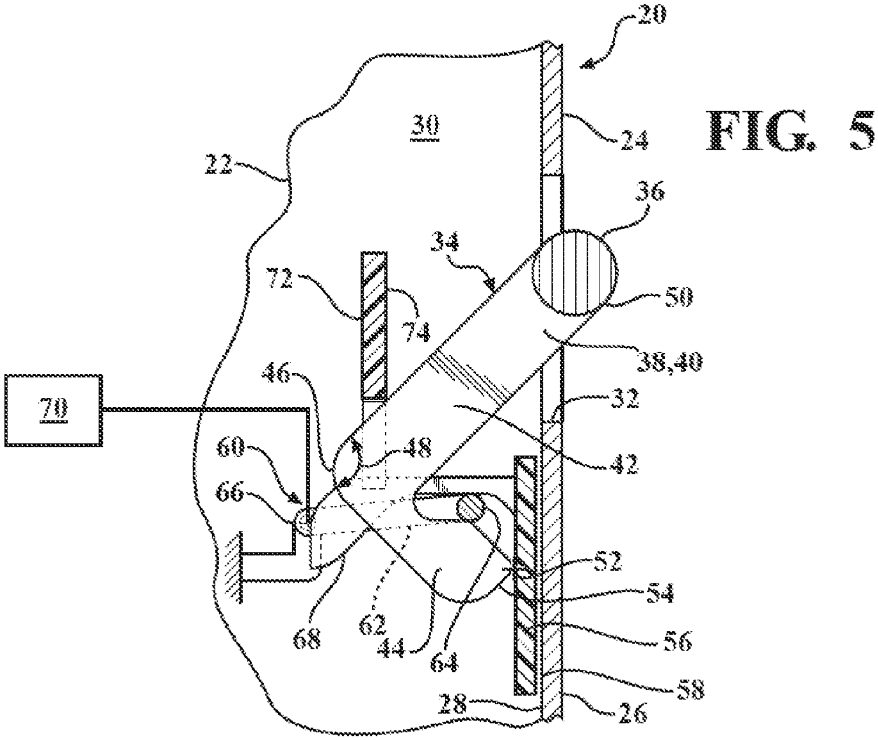
FIG. 5 is a schematic cross sectional view of the door assembly shown in FIG. 2 with the cover shown in an open position and the handle shown in a partially extended position.
Figure 6:
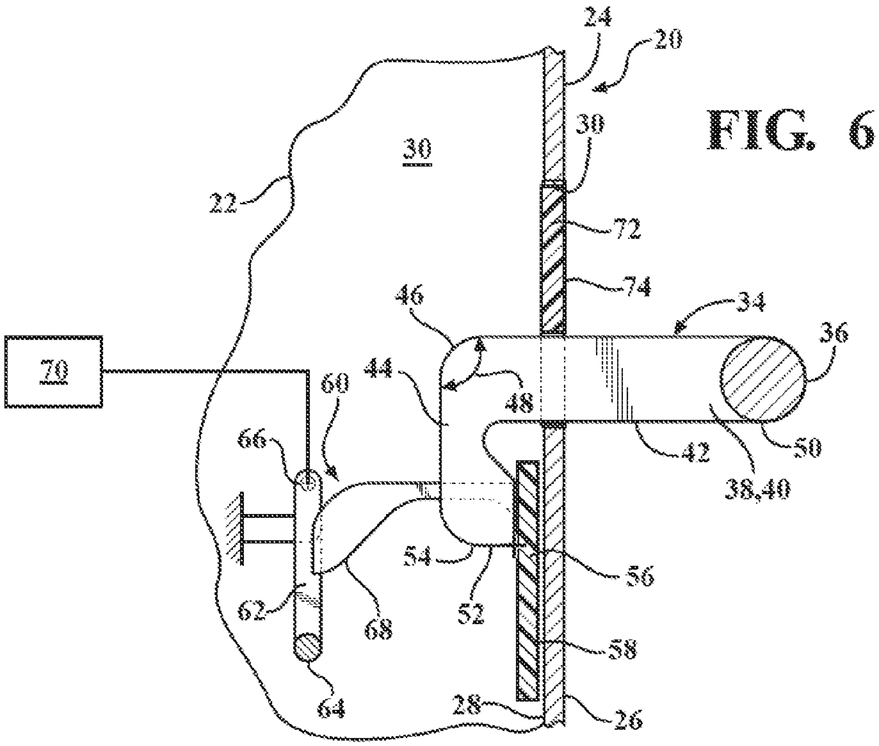
FIG. 6 is a schematic cross sectional view of the door assembly shown in FIG. 3 with the cover shown in the open position, the handle shown in the fully extended position, and the closeout shown in the exposed position.

As best shown in FIGS. 4 through 6, the closure assembly 20 includes a structure 22. The structure 22 includes a side panel 24 attached to the structure 22, and all braces, supports, etc. necessary to support the side panel 24 and the various components of the closure assembly 20 and to attach the closure assembly 20 to the vehicle. The side panel 24 includes an exterior surface 26 and an interior surface 28. The exterior surface 26 is disposed on an outboard side of the side panel 24, and the interior surface 28 is disposed opposite the exterior surface 26 on an inboard side of the side panel 24. As used herein, the term "outboard" refers to a location relative to a center of the vehicle that is located farther away from the center of the vehicle. As such, an inboard location is disposed nearer the center of the vehicle relative to an outboard location, which is disposed farther from the center of the vehicle. The side panel 24 cooperates with the structure 22 to define an interior space 30 adjacent the interior surface 28 of the side panel 24, and disposed inboard of the side panel 24. The side panel 24 defines and opening 32 that extends through the side panel 24, between the exterior surface 26 and the interior surface 28 of the side panel 24.

Figure 2:
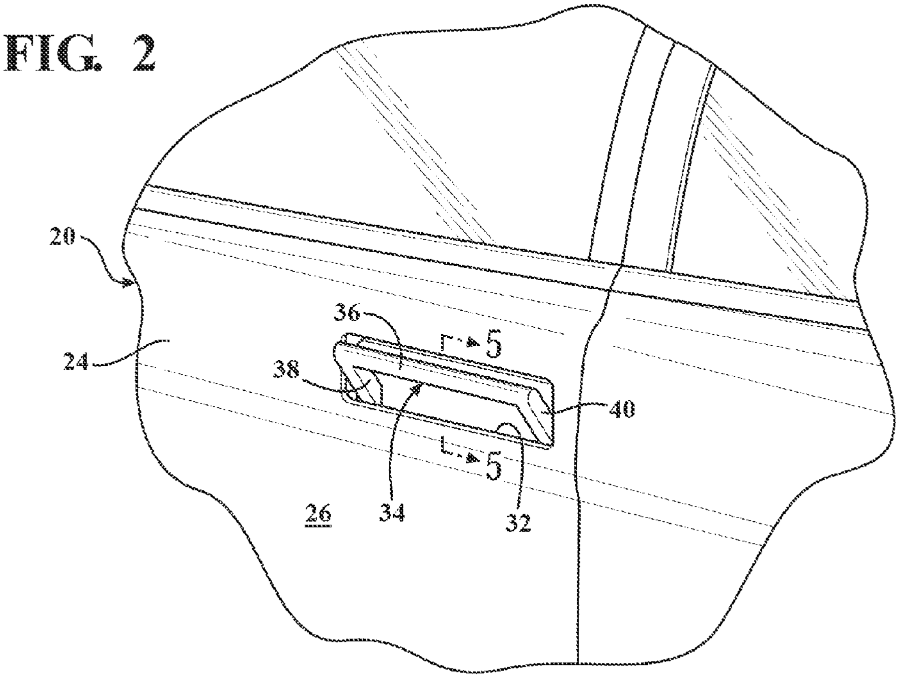
FIG. 2 is a schematic perspective view of the door assembly showing a grab bar of a handle extending through the opening into a partially extended position.
Figure 3:
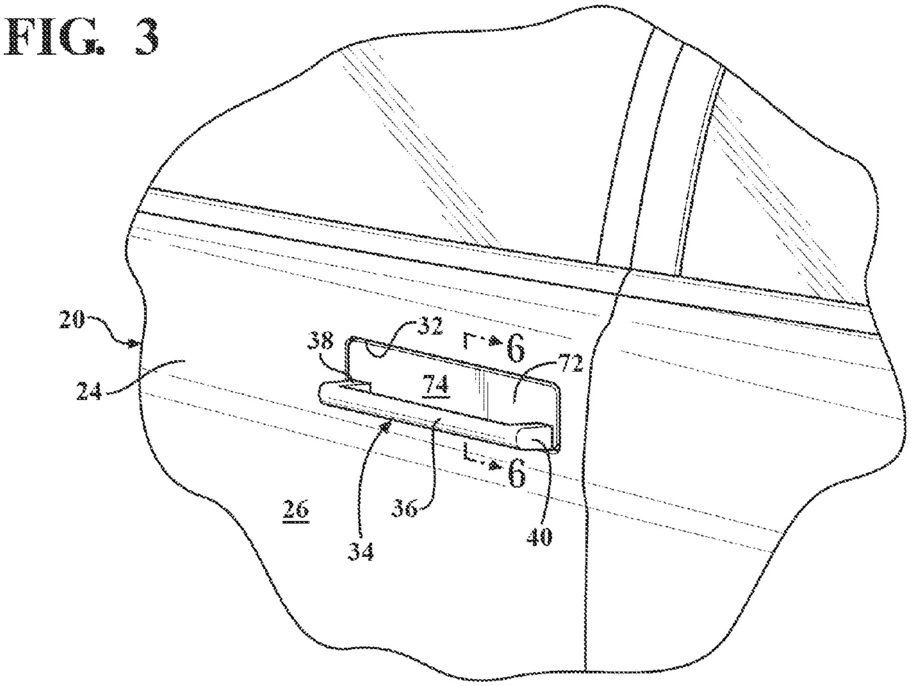
FIG. 3 is a schematic perspective view of the door assembly showing the grab bar in a fully extended position and a closeout in an exposed position.

A handle 34 is rotatably coupled to the structure 22 of the closure assembly 20. Referring to FIGS. 2 and 3, the handle 34 includes a grab bar 36, a first support 38 and a second support 40. The second support 40 is spaced from the first support 38, with the grab bar 36 extending between the first support 38 and the second support 40. Referring to FIGS. 4 through 6, each of the first support 38 and the second support 40 include an extension portion 42 and an arm portion 44. The extension portion 42 and the arm portion 44 of each of the first support 38 and the second support 40 are joined together at a joint 46 forming an angle 48 therebetween. Preferably and as shown, the angle 48 formed at the joint 46 between the extension portion 42 and the arm portion 44 is approximately equal to ninety degrees. However, it should be appreciated that the angle 48 may vary from the perpendicular angle 48 shown. The grab bar 36 is attached to a distal end 50 of the extension portion 42 of the first support 38 and the second support 40 respectively.

Figure 1:
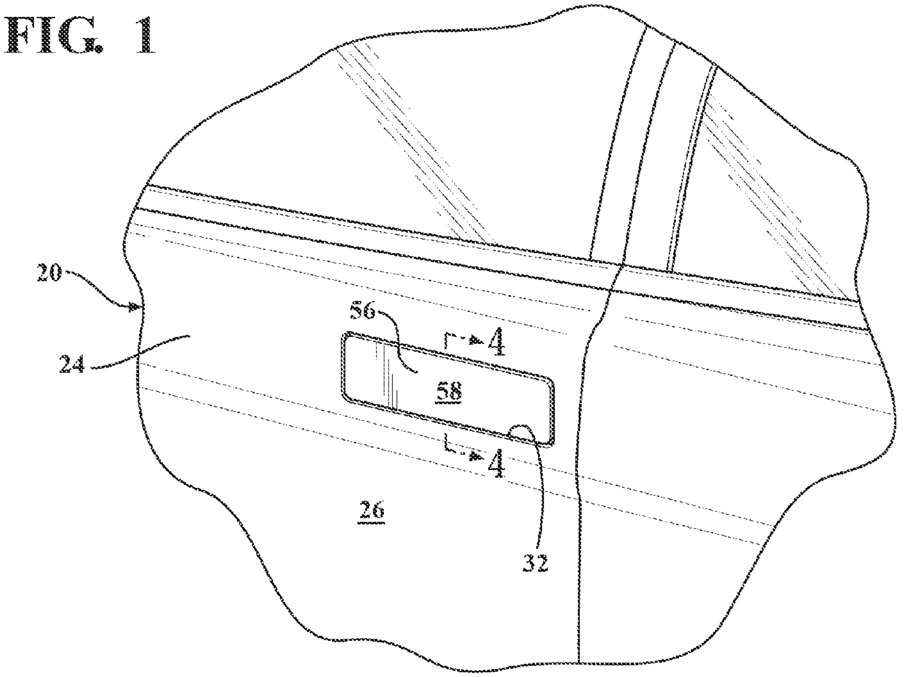
FIG. 1 is a schematic perspective view of a door assembly of a vehicle showing a cover in a closed position to conceal an opening in a side panel of the door assembly.

The handle 34 is rotatably moveable about a rotation axis 52 between a retracted position, shown in FIGS. 1 and 4, and an extended position, shown in FIGS. 3 and 6. The handle 34 may be rotatably coupled to the structure 22 in any suitable manner that allows an approximately ninety degrees of rotation about the rotation axis 52. As shown in FIGS. 4 through 6, the rotation axis 52 is disposed adjacent a distal end 54 of the arm portions 44 of the first support 38 and the second support 40 respectively. The rotation axis 52 is approximately perpendicular to the first support 38 and the second support 40, and is approximately parallel with the grab bar 36 and the side panel 24. However, it should be appreciated that the rotation axis 52 may be positioned at a different location relative to the handle 34 than shown and described herein. When in the retracted position, the handle 34 is completely disposed within the interior space 30 of the closure assembly 20. When in the extended position, the handle 34 partially extends through the opening 32 of the side panel 24 with the grab bar 36 spaced from the exterior surface 26 of the side panel 24, outboard of the side panel 24.

A cover 56 is coupled to the structure 22. The cover 56 is simultaneously moveable with the handle 34 between a closed position, shown in FIGS. 1 and 4, and an open position, shown in FIGS. 2-3 and 5-6. Referring to FIGS. 1 and 4, when the cover 56 is in the closed position, with the handle 34 in the retracted position, the cover 56 is positioned within the opening 32 to cover or conceal the opening 32. Accordingly, the cover 56 is sized and shaped to match the size and shape of the opening 32. Referring to FIGS. 2 and 5-6, when the cover 56 is in the open position, with the handle 34 in the extended position, the cover 56 is disposed within the interior space 30 and spaced from the opening 32 to allow the handle 34 to at least partially extend through the opening 32. The cover 56 simultaneously moves with the handle 34 into the closed position as the handle 34 moves into the retracted position. The cover 56 simultaneously moves with the handle 34 into the open position as the handle 34 moves into the extended position. The cover 56 includes an exterior surface 58 that is disposed approximately flush with the exterior surface 26 of the side panel 24 when the cover 56 is disposed in the closed position, thereby presenting a smooth exterior finish to the closure assembly 20, and concealing the opening 32 when the handle 34 is not in use. As used herein, the term "approximately flush" is defined to include surfaces that are substantially disposed on the same plane, but that may include minor feature differences, such as a surface curvature or design accent, that slightly deviate from the shared plane.

Referring to FIGS. 4 through 6, a cam mechanism 60 interconnects the structure 22 and the cover 56. The cam mechanism 60 is configured for guiding the cover 56 between the closed position and the open position as the handle 34 moves between the extended position and the retracted position. As shown, the cam mechanism 60 includes a lever 62 rotatably coupled to the structure 22. The lever 62 includes a cam follower end 64 that simultaneously rotates about a cam axis 66 with the handle 34 as the handle 34 rotates about the rotation axis 52. The cam axis 66 is parallel with the rotation axis 52. The cam mechanism 60 includes a cam surface 68 that is attached to the cover 56. As shown, the cam surface 68 is cantilevered inboard from the cover 56. The cam follower end 64 of the lever 62 moves along the cam surface 68 during rotational movement of the lever 62 to move the door inboard out of the opening 32 and substantially parallel with the panel between the open position and the closed position.

The closure assembly 20 may include at least one actuator 70 or other actuator that is coupled to and configured for moving the lever 62 and the handle 34. The actuator(s) 70 operates to rotate the handle 34 about the rotation axis 52 between the retracted position and the extended position, and to move the lever 62 about the cam axis 66 to move the cover 56 between the closed position and the open position. The actuator(s) 70 may include, for example, an electric motor or other similar device. The actuator(s) 70 may be coupled to the lever 62 and/or the handle 34 in any suitable manner, such as through mechanical linkages, rods, gear drive trains, etc.

The closure assembly 20 may further include a control module (not shown) configured for controlling the actuator 70. The control module may include a computer or other similar device having all software, hardware, memory, algorithms, sensors, etc. necessary to sense the presence of an operator and/or receive a signal requesting that the handle 34 be moved into the extended position or the retracted position. Upon receiving a signal requesting movement of the handle into the extended or retracted position, or otherwise sensing the presence of an operator and determining the necessity to move the handle into or out of the extended position, the control module signals the actuator 70 to move the handle 34 and the lever 62 as required. Furthermore, the handle 34 may be coupled, for example either electrically or mechanically, to a latch mechanism (not shown) to actuate the latch mechanism to release the closure assembly 20 and allow the closure assembly to open.

The closure assembly 20 may further include a closeout 72. The closeout 72 is coupled to the handle 34, and is moveable between an exposed position, shown in FIGS. 2 and 5, and a hidden position, best shown in FIG. 4. When in the exposed position, the closeout 72 is disposed within the opening 32 with the handle 34 to cover or conceal a portion of the opening 32 not occupied by the handle 34, thereby presenting a closed and concealed opening 32 about the handle 34 extending through the opening 32. The closeout 72 includes an exterior surface 74 that is disposed approximately flush with the exterior surface 26 of the side panel 24 when the closeout 72 is disposed in the exposed position. As noted above, the term "approximately flush" is defined to include surfaces that are substantially disposed on the same plane, but that may include minor feature differences, such as a surface curvature or design accent, that slightly deviate from the shared plane. When in the hidden position, the closeout 72 is disposed within the interior space 30 of the closure assembly 20, and is spaced away from the opening 32 to allow the cover 56 to move into the opening 32 to completely conceal the opening 32. The closeout 72 is simultaneously moveable with the cover 56 and the handle 34 between the exposed position and the hidden position. The closeout 72 moves into the exposed position as the handle 34 moves into the extended position and the cover 56 moves into the open position. The closeout 72 moves into the hidden position as the handle 34 moves into the retracted position and the cover 56 moves into the closed position. As shown, the closeout 72 rotates relative to the handle 34 to maintain a substantially parallel relationship with the side panel 24 as the closeout 72 moves with the handle 34 between the exposed position and the hidden position. However, it should be appreciated that the closeout 72 may be configured to move in some other manner.

The closeout 72 may be coupled to the handle 34 and configured to move in response to movement of the handle 34. Alternatively, the closure assembly 20 may include an actuator 70, such as an electric motor, that is coupled to the closeout 72 and configured to move the closeout 72 with the handle 34. The movement of the actuator 70 may be controlled via the control module as noted above describing the control of the actuator related to the handle 34 and the lever 62. Furthermore, the structure 22 may include guides and/or tracks that are positioned to guide the handle 34, the cover 56 and the closeout 72 along their respective paths, and may further include any and all other mechanical linkages and/or connections necessary to make the handle 34, the cover 56 and the closeout 72 simultaneously move along their respective paths.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A closure assembly comprising:

a structure;

a side panel attached to the structure and including an exterior surface and an interior surface disposed opposite the exterior surface, wherein the side panel cooperates with the structure to define an interior space adjacent the interior surface of the side panel, and wherein the side panel defines an opening extending between the exterior surface and the interior surface of the side panel;

a handle coupled to the structure and including a grab bar, wherein the handle is rotatably moveable about a rotation axis between a retracted position and an extended position, with the handle completely disposed within the interior space when in the retracted position, and with the handle extending through the opening with the grab bar spaced from the exterior surface of the side panel when in the extended position; and a cover coupled to the structure and simultaneously moveable with the handle between an open position and a closed position, with the cover positioned within the opening when in the closed position to cover the opening when the handle is in the retracted position, and with the cover disposed within the interior space and spaced from the opening when the handle is in the extended position to allow the handle to extend through the opening.

2. A closure assembly as set forth in claim 1 wherein the cover simultaneously moves into the closed position as the handle moves into the retracted position, and wherein the cover simultaneously moves into the open position as the handle moves into the extended position.

3. A closure assembly as set forth in claim 2 wherein the cover includes an exterior surface, and wherein the exterior surface of the cover is disposed flush with the exterior surface of the side panel when the cover is disposed in the closed position.

4. A closure assembly as set forth in claim 2 wherein the handle includes a first support and a second support spaced from the first support, with the grab bar extending between the first support and the second support.

5. A closure assembly as set forth in claim 4 wherein each of the first support and the second support include an extension portion and an arm portion joined together at a joint forming an angle therebetween, with the grab bar attached to a distal end of the extension portion of the first support and the second support respectively.

6. A closure assembly as set forth in claim 5 wherein the rotation axis is disposed adjacent a distal end of the arm portions of the first support and the second support respectively.

7. A closure assembly as set forth in claim 6 wherein the rotation axis is approximately perpendicular to the first support and the second support, and wherein the rotation axis is approximately parallel with the grab bar and the side panel.

8. A closure assembly as set forth in claim 7 comprising a cam mechanism configured for guiding the cover between the closed position and the open position as the handle moves between the extended position and the refracted position.

9. A closure assembly as set forth in claim 8 wherein the cam mechanism includes a lever rotatably coupled to the structure and having a cam follower end simultaneously rotatable about a cam axis with the handle.

10. A closure assembly as set forth in claim 9 wherein the cam mechanism includes a cam surface attached to the cover, and wherein the cam follower end of the lever moves along the cam surface during rotational movement of the lever to move the door substantially parallel with the panel between the open position and the closed position.

11. A closure assembly as set forth in claim 9 wherein the cam axis is parallel with the rotation axis.

12. A closure assembly as set forth in claim 9 comprising an actuator coupled to the lever and configured for rotating the lever about the cam axis.

13. A closure assembly as set forth in claim 1 comprising a closeout coupled to the handle and moveable between an exposed position and a hidden position, wherein the closeout is disposed within the opening to conceal the opening when in the exposed position, and wherein the closeout is disposed within the interior space and spaced from the opening when in the hidden position.

14. A closure assembly as set forth in claim 13 wherein the closeout is simultaneously moveable with the cover and the handle between the exposed position and the hidden position, wherein the closeout moves into the exposed position as the handle moves into the extended position and the cover moves into the open position, and wherein the closeout moves into the hidden position as the handle moves into the retracted position and the cover moves into the closed position.

15. A closure assembly as set forth in claim 14 wherein the closeout includes an exterior surface, and wherein the exterior surface of the closeout is disposed flush with the exterior surface of the side panel when the closeout is disposed in the exposed position.

16. A closure assembly as set forth in claim 14 wherein the closeout rotates relative to the handle as the closeout moves between the exposed position and the hidden position.

17. A door assembly for a vehicle, the door assembly comprising:

a structure;

a side panel attached to the structure and including an exterior surface and an interior surface disposed opposite the exterior surface, wherein the side panel cooperates with the structure to define an interior space adjacent the interior surface of the side panel, and wherein the side panel defines an opening extending between the exterior surface and the interior surface of the side panel;

a handle coupled to the structure and including a grab bar, wherein the handle is rotatably moveable about a rotation axis between a retracted position and an extended position, with the handle completely disposed within the interior space when in the retracted position, and with the handle extending through the opening with the grab bar spaced from the exterior surface of the side panel when in the extended position;

a cover coupled to the structure and simultaneously moveable with the handle between an open position and a closed position, with the cover positioned within the opening when in the closed position to cover the opening when the handle is in the retracted position, and with the cover disposed within the interior space and spaced from the opening when the handle is in the extended position to allow the handle to extend through the opening;

a cam mechanism configured for guiding the cover between the closed position and the open position as the handle moves between the extended position and the retracted position;

a closeout coupled to the handle and moveable between an exposed position and a hidden position, wherein the closeout is disposed within the opening to conceal the opening when in the exposed position, and wherein the closeout is disposed within the interior space and spaced from the opening when in the hidden position; and wherein the closeout is simultaneously moveable with the cover and the handle between the exposed position and the hidden position, wherein the closeout moves into the exposed position as the handle moves into the extended position and the cover moves into the open position, and wherein the closeout moves into the hidden position as the handle moves into the retracted position and the cover moves into the closed position.

18. A door assembly as set forth in claim 17 wherein the handle includes:

a first support and a second support spaced from the first support, with the grab bar extending between the first support and the second support;

wherein each of the first support and the second support include an extension portion and an arm portion joined together at a joint forming an angle therebetween, with the grab bar attached to a distal end of the extension portion of the first support and the second support respectively; and wherein the rotation axis is disposed adjacent a distal end of the arm portions of the first support and the second support respectively.

19. A door assembly as set forth in claim 18 wherein:

the cam mechanism includes a lever rotatably coupled to the structure and includes a cam follower end simultaneously rotatable about a cam axis with the handle; and wherein the cam mechanism includes a cam surface attached to the cover, with the cam follower end of the lever moveable along the cam surface during rotational movement of the lever to move the door substantially parallel with the panel between the open position and the closed position.

20. A door assembly as set forth in claim 19 comprising an actuator coupled to the lever and configured for rotating the lever about the cam axis.

* * * * *